US010802925B2

(12) United States Patent
Borate et al.

(10) Patent No.: US 10,802,925 B2
(45) Date of Patent: Oct. 13, 2020

(54) SYNTHETIC FULL BACKUP STORAGE OVER OBJECT STORAGE

(71) Applicant: Druva, Inc., Sunnyvale, CA (US)

(72) Inventors: Milind Borate, Pune (IN); Gaurav Gangalwar, Pune (IN)

(73) Assignee: DRUVA INC., Sunnyvale, CA (US)

( * ) Notice: Subject to any disclaimer, the term of this patent is extended or adjusted under 35 U.S.C. 154(b) by 289 days.

(21) Appl. No.: 15/860,525

(22) Filed: Jan. 2, 2018

(65) Prior Publication Data

US 2018/0189145 A1 Jul. 5, 2018

(30) Foreign Application Priority Data

Jan. 5, 2017 (IN) .............................. 201741000527

(51) Int. Cl.
*G06F 11/14* (2006.01)
*G06F 3/06* (2006.01)
*G06F 16/11* (2019.01)
*G06F 16/185* (2019.01)

(52) U.S. Cl.
CPC .......... *G06F 11/1451* (2013.01); *G06F 3/065* (2013.01); *G06F 3/0619* (2013.01); *G06F 3/0685* (2013.01); *G06F 11/1464* (2013.01); *G06F 16/128* (2019.01); *G06F 16/185* (2019.01); *G06F 11/1453* (2013.01); *G06F 2201/80* (2013.01); *G06F 2201/805* (2013.01); *G06F 2201/82* (2013.01)

(58) Field of Classification Search
USPC .................................................. 707/638, 645
See application file for complete search history.

(56) References Cited

U.S. PATENT DOCUMENTS 9,959,280 B1 * 5/2018 Whitehead ............ G06F 16/162
2015/0261798 A1 * 9/2015 Serlet .................. G06F 16/1752
707/638

* cited by examiner

*Primary Examiner* — Hung T Vy
(74) *Attorney, Agent, or Firm* — Fenwick & West LLP

(57) ABSTRACT

Disclosed embodiments include a method (system and non-transitory computer-readable medium) for backing up updated portions of a plurality files having hierarchical relationships through object storage. In one or more embodiments, a file is segregated into chunks, and objects corresponding to the chunks are generated for storage at an object storage. For a chunk, an object for storing the chunk and additional objects for storing mapping information are generated. The mapping information may include path information identifying a path of the file in a hierarchical structure, a file version list identifying a version of the file, a chunk list describing an association between the file and the chunks, a chunk version list identifying a version of the chunk, etc. When a portion of the file is updated, objects corresponding to the updated portion of the file can be generated, and stored at the object storage.

12 Claims, 8 Drawing Sheets

SYNTHETIC FULL BACKUP STORAGE OVER OBJECT STORAGE

CROSS REFERENCE TO RELATED APPLICATION

This application claims a benefit of, and priority to, India Patent Application No. 201741000527, filed Jan. 5, 2017, which is incorporated by reference in its entirety herein.

TECHNICAL FIELD

The disclosure generally relates to the field of data storage, and in particular to synthetic full backup storage of data through object storage.

BACKGROUND

Proliferation of electronic devices such as computers, smart phones, tablets, laptops, and servers prompts spawning of vast amount of electronic data. The data stored by an electronic device include a plurality of electronic files (herein also referred to as "files" for simplicity) having hierarchical relationships for ease of organization. As electronic devices increase in performance year to year, the amount of data they generate also increases. However, storing files having hierarchical relationships fails to scale economically and efficiently. For example, when the amount of data grows into the range of hundreds of terabytes or even petabytes, storing files having hierarchical relationships suffers from long search latency and reliability issues.

Distributing contents over multiple storage machines may offer a performance advantage over a conventional approach of storing files having hierarchical relationships. In one example, data are stored in a form of objects with an associated name. The data, that are contents of an object, are identified by the name of the object. Storage reliability may improve by partitioning data, and storing multiple copies of the same object at different storage machines. The amount of storage of the object storage may be increased by adding a new storage machine to the existing machines and distributing a portion of one or more partitions of the contents to the new storage machine.

However, using object storage system for backup storage in a naive fashion also has disadvantages. For example, if a backup copy of a large file is created by simply uploading the file to an object, when a portion of a file stored by a client device is updated, an entirety of the updated file is uploaded to the object storage again. The operation of backing up the entire file creates unnecessary duplicative objects corresponding to existing portions of the file, rendering inefficient usage of computing resources (e.g., processor and storage space). Moreover, there is a lack of an efficient approach of mapping an updated portion of the file having a hierarchical relationship with other files or folders to a corresponding object.

Accordingly, a naive approach of backing up data through object storage is inefficient in terms of computing resources.

DETAILED DESCRIPTION

Figure 1:
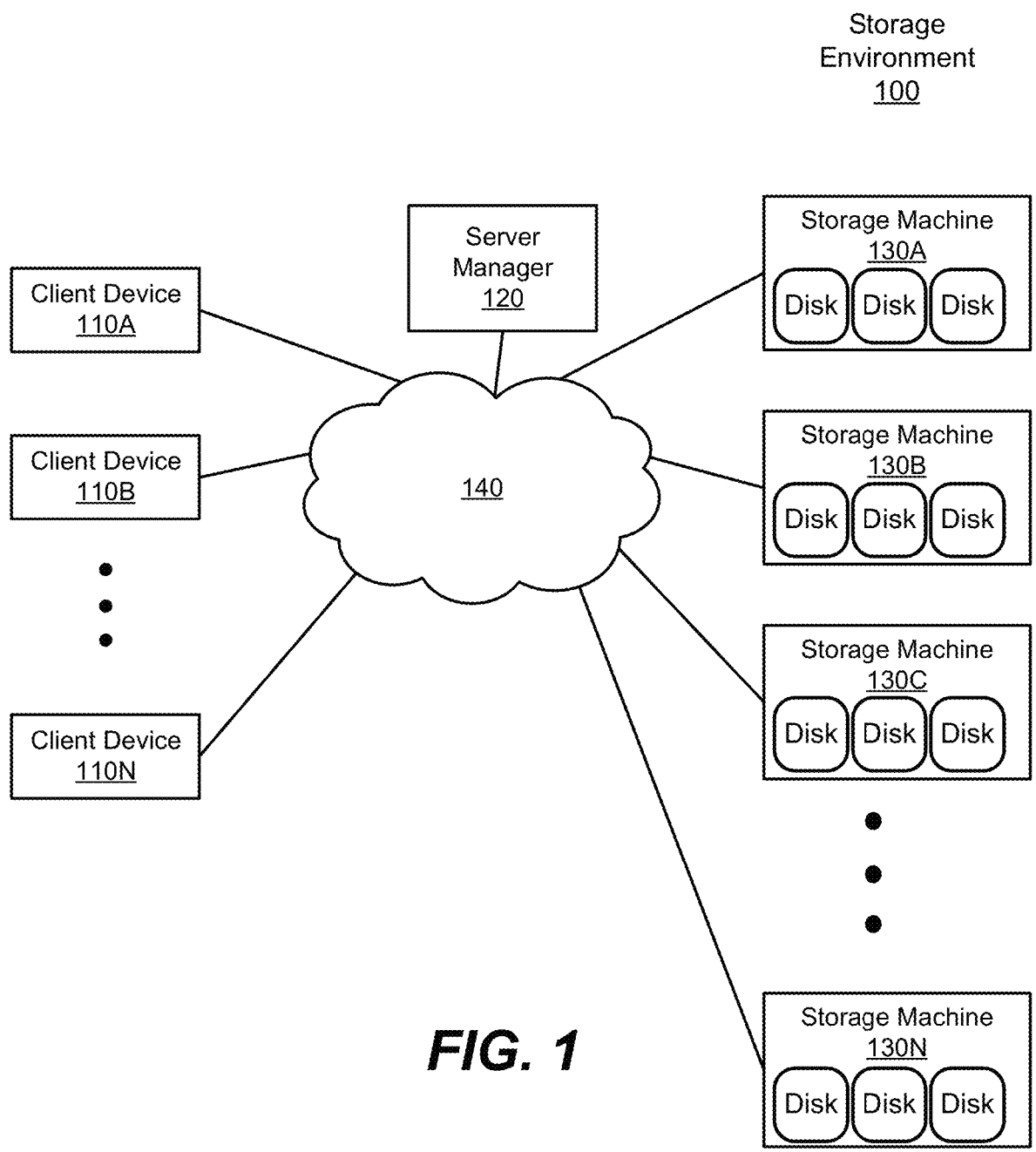
FIG. 1 illustrates a storage environment, in accordance with an embodiment.

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Example embodiments of disclosed configurations include a method (and/or a system and non-transitory computer storage readable medium) for backing up updated portions of a plurality of files having hierarchical relationships through object storage. Object storage (also known as object-based storage) may be a computer data storage architecture that manages data as objects. An object typically includes the data itself, a variable amount of metadata, and a globally unique identifier.

In one or more example embodiments, a file may be segregated into a plurality of chunks, and objects corresponding to the plurality of chunks are generated for storage at an object storage. A chunk may be a fragment of information, which typically contains a header, which indicates some parameters (e.g. the type of chunk, comments, size etc.) The chunk may contain data, which may be decoded by a program from the parameters in the header.

For a chunk, an object for storing the chunk and additional objects for storing mapping information are generated. The mapping information may include path information identifying a path of the file in a hierarchical structure, a file version list identifying a version of the file, a chunk list describing an association between the file and the chunks, a chunk version list identifying a version of the chunk, etc. Examples of mapping information, path information, file version list, chunk list, and chunk version list are described below with respect to FIG. 5.

A file version list allows a computer file to exist in several versions at the same time, thus providing a form of revision control. When a portion of the file may be updated, objects corresponding to the updated portion of the file and the corresponding mapping information can be generated, and stored at the object storage. Accordingly, unnecessary storage of duplicative portions of the file may be eschewed.

In one or more embodiments, each object name could be formed by a combination of one or more of a user identifier of a user owning a file, server identifier of a server (e.g., IP address of server) on which a file resides, and virtual disk identifier if a file represents a virtual disk. A virtual disk or a virtual drive are software components that emulate an actual disk storage device. Virtual disks and virtual drives are common components of virtual machines in hardware virtualization, but they may also be used for the creation of logical disks.

Example Storage Environment

FIG. (FIG. 1 illustrates one embodiment of a storage environment 100. The storage environment 100 comprises a server manager 120 that provides data storage services to one or more client devices 110A, 110B . . . 110N (generally herein referred to as "client devices 110") over a network 140 through one or more storage machines 130A, 130B . . . 130N (generally herein referred to as "servers 130" or "object storage 130"). A client device 110 may send a request to read, add, delete, or modify data to the server manager 120. Examples of data requested to be stored include, but are not limited to, a text file, an image file, an audio clip, a video clip, or any combination thereof. The client device 110 can be any computing device that has data that requires backup. Examples of such a device include a personal computer (PC), a desktop computer, a notebook, a tablet computer, or any other suitable electronic device. Examples also include a device executing an operating system, for example, a MICROSOFT WINDOWS-compatible operating system (OS), APPLE OS X or iOS, GOOGLE ANDROID and/or a LINUX distribution. The client device 110 can also be any device having computer functionality, such as a personal digital assistant (PDA), a mobile telephone, a smartphone, a device executing the APPLE iOS operating system, the GOOGLE ANDROID operating system, WINDOWS MOBILE operating system, or WEBOS operating system. Computer functionality and structure are described further in conjunction with FIG. 6. The client device 110 may also be a server device that requires backup, such as a web server (running for example APACHE), a file server, a database server, etc. Although such server devices may perform server functions in an organization, from the point of view of the server manager 120, they are treated like any other client device that requires data backup services.

The server manager 120 may be a software or a hardware component (e.g., the computing machine of FIG. 6) that enables the client device 110A to backup data by one or more storage machines 130 and access the backed up data. The server manager 120 receives a request from the client device 110 to upload data for storage on the one or more storage machines 130, and then stores the requested data. Moreover, the server manager 120 retrieves data that has been stored previously on the one or more storage machines 130, in response to a request from the client device 110. The server manager 120 can determine a storage machine 130 associated with a client using a client device 110. In one embodiment, the server manager 120 performs full backup of the received data first, identifies an updated portion of the data, then stores the updated portion as further described in conjunction with FIGS. 2 through 5. Preferably, storing of duplicative portions of the data is eschewed. In one embodiment, the server manager 120 may be implemented using one or more computer servers that have a network communications capability. In another embodiment, the server manager 120 is implemented using cloud services. A cloud service is a service made available to users on demand via the Internet from a cloud computing provider's servers as opposed to being provided from a company's own on-premises servers, for example, AMAZON WEB SERVICES, GOOGLE CLOUD PLATFORM, IBM SOFTLAYER, or MICROSOFT AZURE.

The interaction between the client device 110, the server manager 120, and the one or more storage machines 130 are typically performed via a network 140, for example, via the Internet. The network 140 enables communications between the client device 110 and the server manager 120 as well as with the one or more storage machines 130. In one embodiment, the network 140 uses standard communications technologies and/or protocols. Thus, the network 140 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 140 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 140 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 140 can also include links to other networks such as the Internet.

In some embodiments, one or more storage machines 130 may be implemented as a virtual machine operating on a client device 110.

Block Diagram of Example Server Manager

Figure 2:
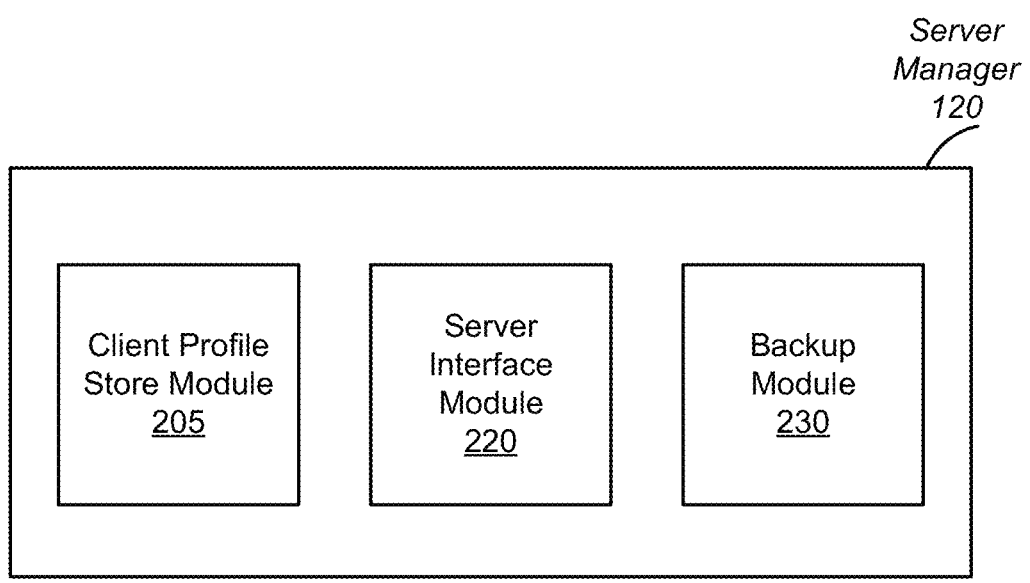
FIG. 2 illustrates a block diagram of a server manager, in accordance with an embodiment.

FIG. 2 illustrates a block diagram of an embodiment of the server manager 120. The server manager 120 shown in FIG. 2 includes a client profile store module 205, a server interface module 220, and a backup module 230. In other embodiments, the server manager 120 may include additional, fewer, or different components for various applications. The server manager 120 may be implemented as a computing device as described in FIG. 6.

The server interface module 220 receives requests from one or more client devices 110 and executes the requests. Specifically, the server interface module 220 receives a request to store input data from the client device 110, and executes the request to store the input data at one or more storage machines 130 through the backup module 230. The data from the client devices 110 may be segregated into one or more partitions. Data Partitioning is the process of logically and/or physically partitioning data into segments that are more easily maintained or accessed for increased performance, load balancing, or utility processing. A partition may be a division of a logical database or its constituent elements into distinct independent parts. Data segregation refers to the principle or policy by which access and storage of data from different devices or different users is segmented to prevent users from accessing restricted data belonging to other users.

The backup module 230 may distribute the segregated partitions to one or more storage machines 130. Moreover, the server interface module 220 may receive a request from the storage machine 130 to read (or access) data stored at one or more storage machines 130. The server interface module 220 may retrieve partitions associated with the requested data from the one or more storage machines 130 according to information describing how the data are partitioned and stored. The server interface module 220 may combine the retrieved partitions; and provide the combined partitions to the client device 110. Furthermore, the server interface module 220 may receive, from the client device 110, a request to add, delete, or modify a specific data file, and execute the request. In one aspect, the client device 110 interfacing the server interface module 220 is neither aware of how the data is partitioned nor distributed, but rather recognizes that the data are stored at a single storage machine 130. Detailed operations of the server manager 120 are described below with respect to FIGS. 3 through 5 below.

The client profile store module 205 stores identifications for client devices 110 and identifications of one or more storage machines 130 associated with a client device 110. In one example embodiment, the client profile store module 205 may be embodied as a look-up table. As described in this example, a client device 110A may be associated with one or more storage machines 130, as shown in FIG. 1. For example, the identification of storage machines 130A and 130B may be stored with an association to the identification of the client device 110A. Through the client profile store module 205, the server interface module 220 or the backup module 230 may identify one or more storage machines e.g., storage machines 130A, 130B, or a disk of a storage machine 130 associated with a client device, e.g., a client device 110A. Additionally, the client profile store module 205 may store mapping information describing how files are stored at the associated storage machines 130 or disks. Examples of the mapping information are described in detail below with respect to FIGS. 2, 4A, 4B, 4C and 5 below.

The backup module 230 may receive an instruction to backup a plurality of files having hierarchical relationships from the client profile store module 205. The backup module 230 generates objects corresponding to the backup data. In one embodiment, the backup module 230 segregates each file into a plurality of chunks. Furthermore, the backup module 230 generates mapping information, for each file, describing an association between a file and a corresponding partition, an association between the file and a corresponding chunk, a version of the file, a version of a chunk, etc. In another embodiment, a virtual disk for configuring a virtual machine is treated as a file being backed up. Hence, the virtual disk is segregated into plurality of chunks and mapping information describing association between the virtual disk and a corresponding chunk. Any process applied to a file for a backup herein may be applied to a virtual disk or a file stored in the virtual disk implemented by a computer system (e.g., computer system 600 of FIG. 6.).

In one aspect, the backup module 230 may perform a full backup of the entirety of the plurality of files, and stores objects associated with the plurality of files at one or more storage machines 130. After the full backup, the backup module 230 may identify updates to any of the plurality of files, and performs an incremental backup on the updated portion of the plurality of files. When the incremental backup is performed, new objects corresponding to the updated portion may be generated and stored at one or more storage machine 130, without having to store duplicative objects corresponding to existing portions of the plurality of files. A detailed process of performing a full backup and an increment backup is described below with respect to FIGS. 3 through 5 below.

To backup a file, the backup module 230 generates a plurality of objects. Each object stores the corresponding data (also referred to as value or content of the object) and may have a name (also referred to as key or an identifier) to retrieve the content. The content may be a portion of the file, mapping information associated with the file. For example, the backup module 230 generates an object for storing a chunk. Moreover, the backup module 230 generates objects for storing mapping information. The objects may describe (i) path information identifying a path of the file in a hierarchical structure, (ii) a file version list identifying a version of the file, (iii) a chunk list describing an association between the file and associated chunks, (iv) a chunk version list identifying a version of a chunk, (v) a server identifier, and (vi) a virtual disk identifier. Hence, when a portion of the file is updated, objects corresponding to the updated portion of the file can be generated, and stored at one or more storage machines 130.

Process for Backing Up Electronic Files

Figure 3:
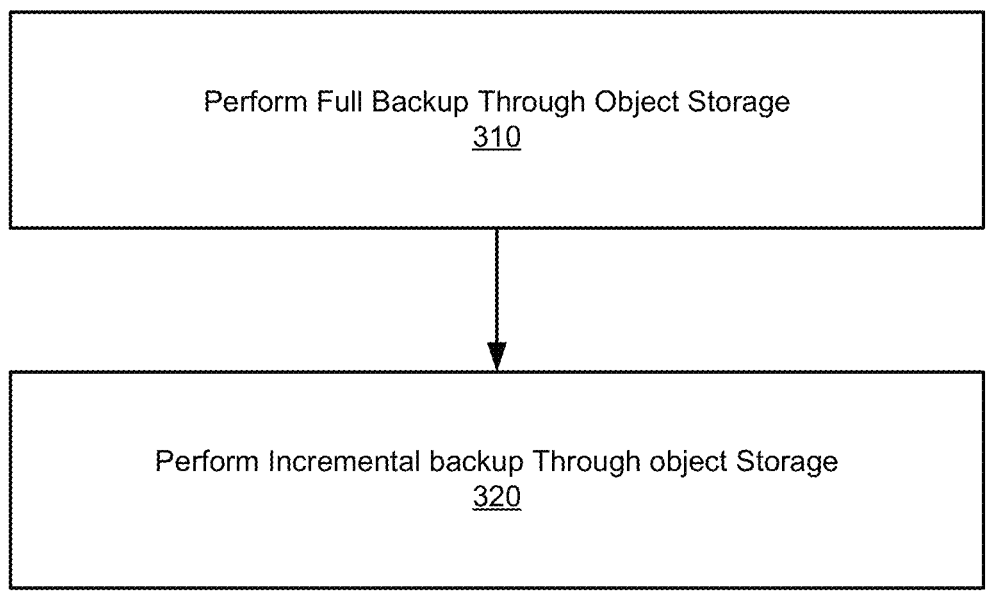
FIG. 3 is an example process of backing up electronic files having hierarchical relationships through object storage, in accordance with an embodiment.

FIG. 3 illustrates an example process of backing up electronic files having hierarchical relationships through object storage, in accordance with an embodiment. The steps in FIG. 3 may be performed by the server manager 120 (e.g., backup module 230). In some embodiments, the steps in FIG. 3 may be performed in conjunction with other suitable components (e.g., storage machine 130).

The server manager 120 receives data including a plurality of files having hierarchical relationships, and performs 310 a full backup through object storage. The server manager 120 generates a plurality of objects to store chunks of the plurality of files, and other information (e.g., version list, mapping information, chunk list, etc.) associated with the chunks. The objects generated for the full backup are stored at one or more storage machines 130, according to mapping information stored at the client profile store module 205. The full backup may be performed once, when the data is backed up for a first time. The full backup may also be performed periodically, or in response to a request from the client device 110.

The server manager 120 performs 320 an incremental backup. Specifically, the client device 110 may automatically determine an updated portion of the data, and determine chunks corresponding to the updated portion. For example, the updated portions of a virtual disk could be identified by changed block tracking mechanism. Moreover, the server manager 120 generates additional objects to update mapping information of the chunks. Additional objects generated may include information (e.g., a version, a file list, a chunk list, path information etc.) associated with the updated chunks. The additional objects generated for the incremental backup are stored at one or more storage machines 130. The incremental backup may be performed periodically, or in response to a request from the client device 110. In some embodiments, the full backup may be performed, after the incremental backup is performed for a predetermined number of times or after the incremental backup is performed for a predetermined time period.

Process for Generating Mapping Information

Figure 4A:
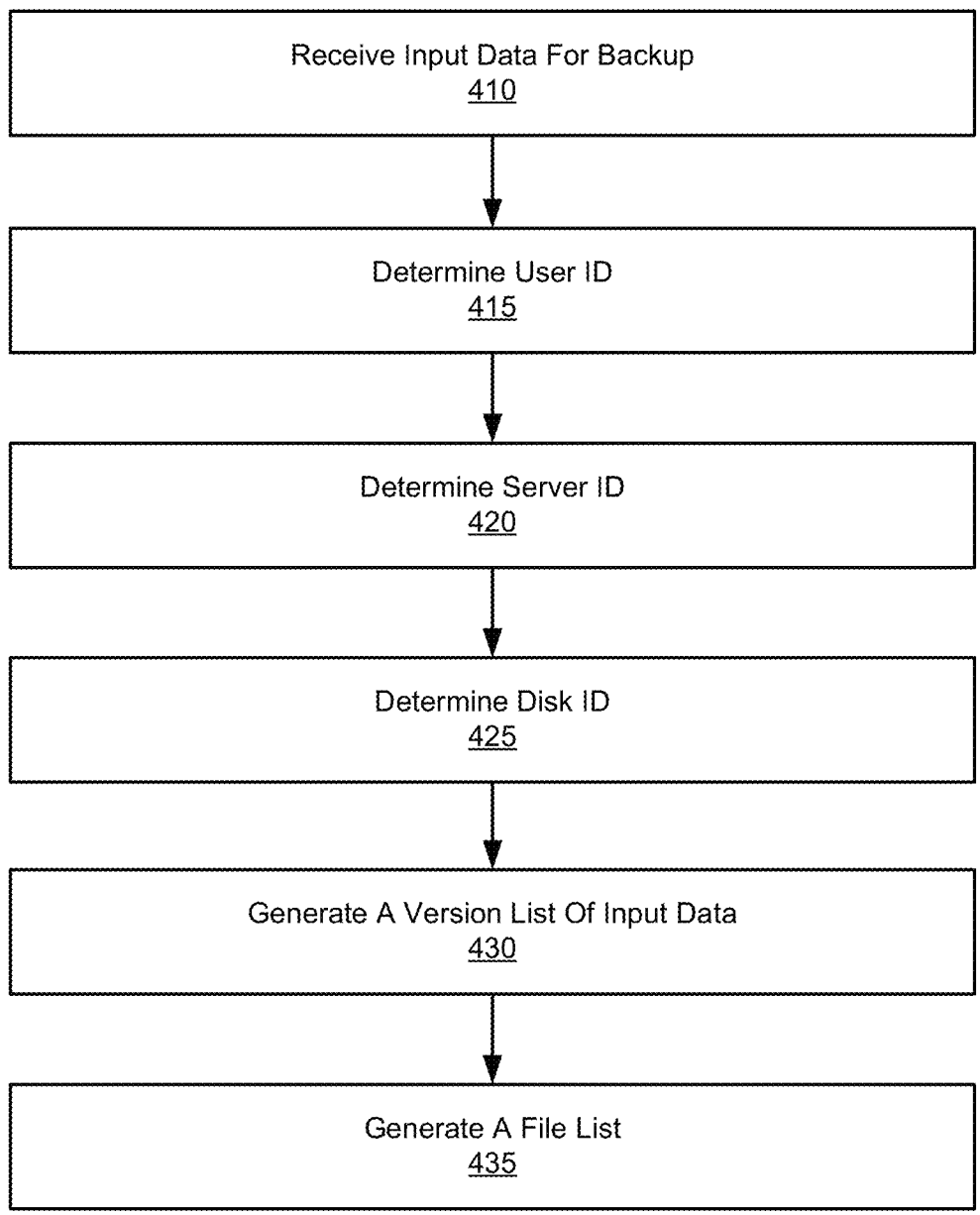
FIG. 4A illustrates an example process of generating mapping information for backing up electronic files having hierarchical relationships, in accordance with an embodiment.

FIG. 4A illustrates an example process of generating mapping information for backing up electronic files having hierarchical relationships, in accordance with an embodiment. The steps in FIG. 4A may be performed by the server manager 120, for example, when performing a full backup. In some embodiments, the steps in FIG. 4A may be performed in conjunction with other suitable components (e.g., storage machine 130). In other embodiments, the process may be performed in a different sequence or include different and/or additional steps than those shown in FIG. 4A.

The server manager 120 receives 410 the input data including files stored in a hierarchical structure. The server manager 120 determines 415 a user identification (or an identification of a client device 110 associated with a user) requesting to backup the files.

The server manager 120 determines 420 a server identification identifying a storage machine 130 by which objects associated with the files can be stored. In addition, the server manager 120 determines 425 a disk identification of storage machines 130 identifying a disk of a storage machine 130 by which objects associated with the files can be stored.

Furthermore, the server manager 120 generates 430 a version list of the input data identifying a version of the data, and generates 435 a file list of input data identifying a plurality of files included in the input data, and hierarchical relationships among the plurality of files.

The server manager 120 may generate objects for storing the user identification, server identification, disk identification, the version list of the input data, and the file list of the input data.

Process of Backing Up an Electronic File

Figure 4B:
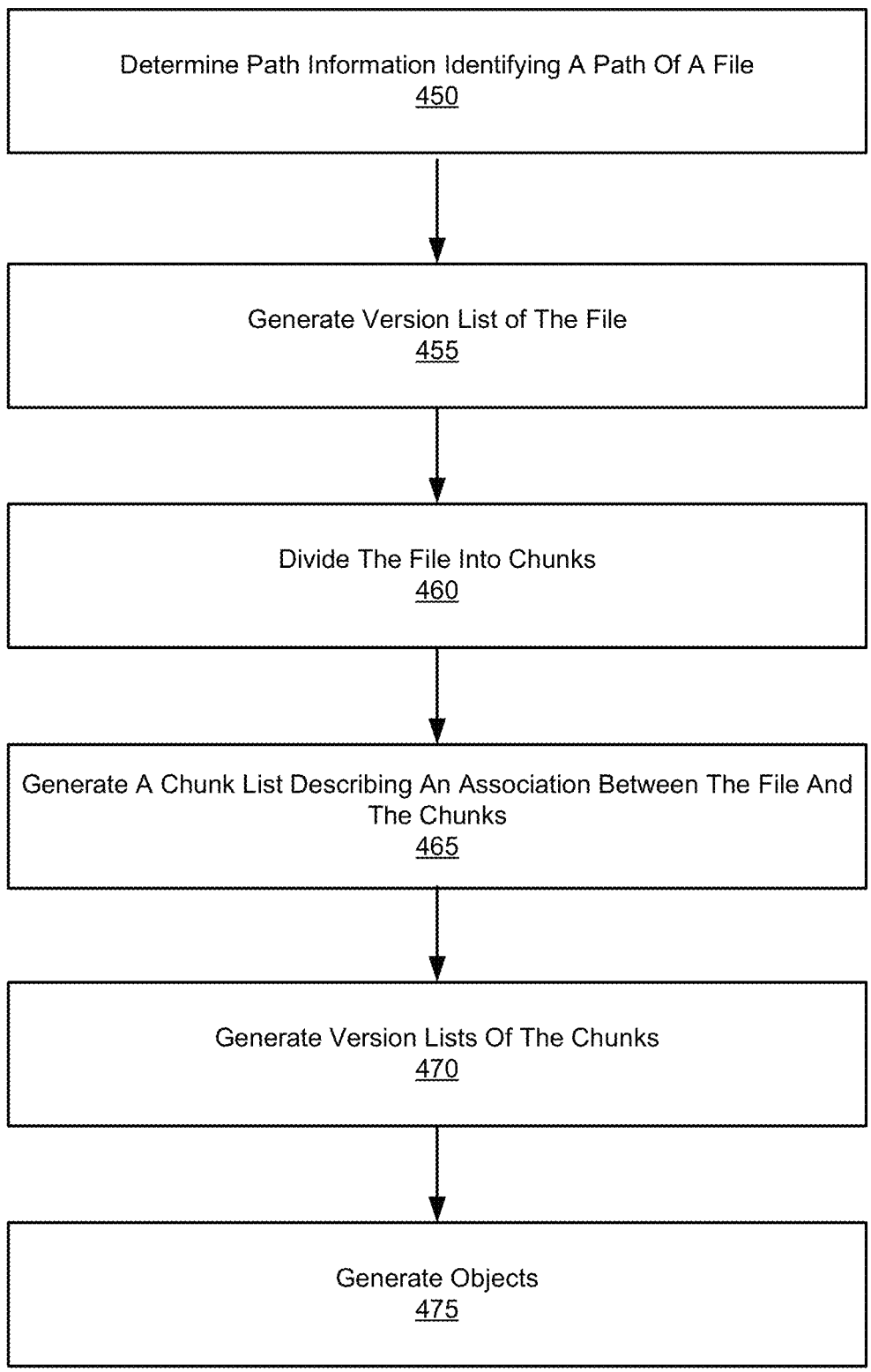
FIG. 4B illustrates an example process of backing up an electronic file having a hierarchical relationship with other electronic files or folders, in accordance with an embodiment.

FIG. 4B illustrates an example process of backing up an electronic file from a plurality of electronic files, in accordance with an embodiment. The steps in FIG. 4B may be performed by the server manager 120, for example, when performing a full backup after performing some or all of the steps in FIG. 4A. Alternatively, the steps in FIG. 4B may be performed before performing steps in FIG. 4A, or may be performed in parallel. In other embodiments, the method may be performed in a different sequence, or include different, fewer, and/or additional steps than those shown in FIG. 4B.

From a plurality of files, the server manager 120 selects a file, and determines 450 path information identifying a path of the file within a hierarchical structure. In addition, the server manager 120 generates 455 a version list of the file identifying a version of the file.

The server manager 120 segregates 460 the file into a plurality of chunks, and generates 465 a chunk list describing an association between the file and the chunks. In addition, the server manager generates 470 version lists of the chunks, where each version list of a corresponding chunk identifies a version of the corresponding chunk.

The server manager 120 generates 475 objects for storage at storage machines 130. Specifically, the server manager 120 generates objects for storing chunks, where each object stores content of a corresponding chunk. In addition, the server manager 120 generates additional objects for storing chunk version lists, where each of the additional objects stores a corresponding chunk version identifying a version of a chunk. Moreover, the server manager 120 generates an object for storing a chunk list of the file. Furthermore, the server manager 120 generates an object for storing path information of the file, and an object for storing a file version list identifying a version of the file.

The server manager 120 may repeat some of the steps in FIG. 4A and FIG. 4B to generate additional objects for other files to backup the plurality of files for performing a full backup.

Process for Backing Up an Updated Portion of an Electronic File

Figure 4C:
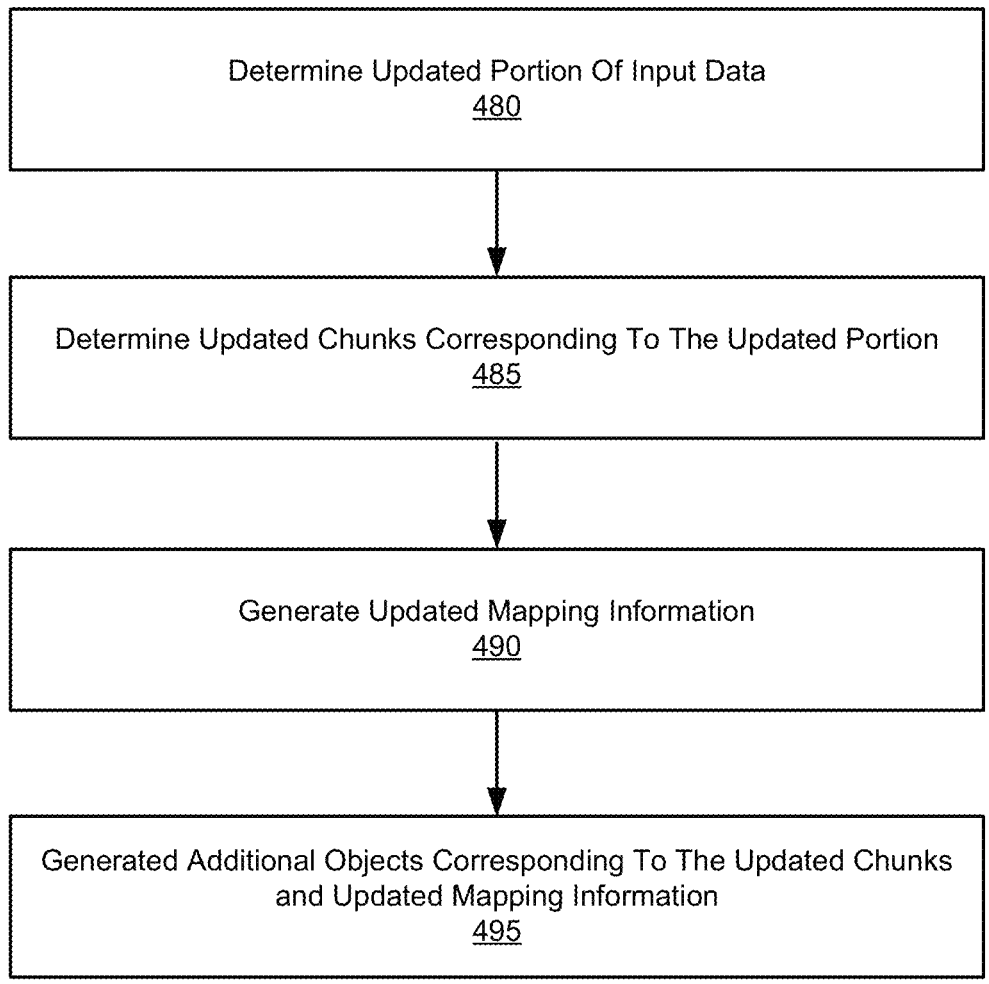
FIG. 4C illustrates an example process of backing up an updated portion of an electronic file, in accordance with an embodiment.

FIG. 4C illustrates an example process of backing up an updated portion of an electronic file, in accordance with an embodiment. The steps in FIG. 4C may be performed by the server manager 120, for example, when performing an incremental backup after the full backup, or after another incremental backup. In other embodiments, the method may be performed in a different sequence, or include different, fewer and/or additional steps than those shown in FIG. 4C.

The server manager 120 determines 480 an updated portion of the input data, and determines 485 one or more chunks corresponding to the updated portion of the input data.

The server manager 120 generates 490 updated mapping information of the updated chunks. Examples of the updated mapping information includes an updated disk version list, an updated file version list, an updated file list, an updated chunk version list, an updated chunk list, etc.

Assuming, for example, that a file comprises a first chunk and a second chunk and that only the first chunk is updated. The server manager 120 updates a disk version list of a disk on which the first chunk is stored, a file version list of the file, a chunk version list of the first chunk, path information of the file, etc. Objects corresponding to duplicative portions (e.g., a chunk version list of the second chunk) may remain unchanged.

The server manager 120 generates 495 additional objects corresponding to the updated chunks and the updated mapping information.

Example Objects Created for Backing Up Electronic Files

Figure 5:
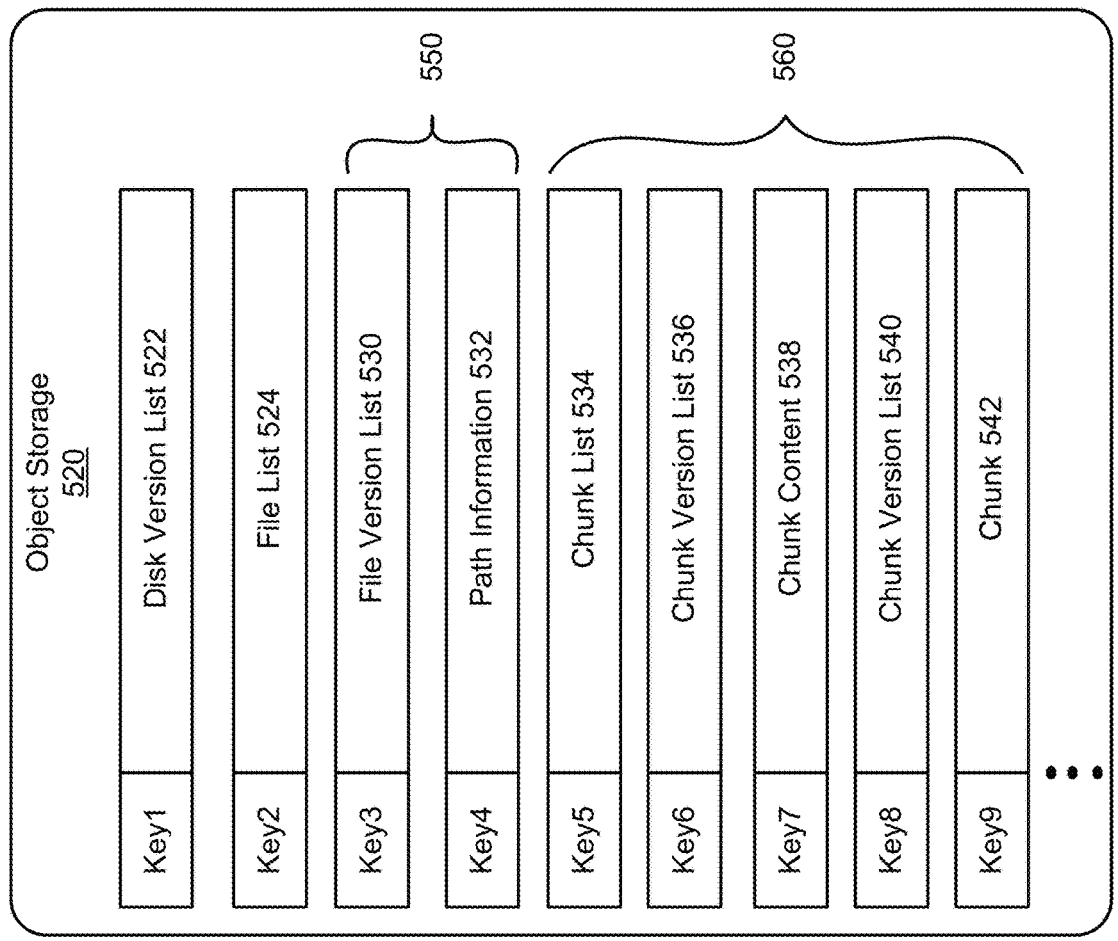
FIG. 5 illustrates examples of objects created for backing up electronic files having hierarchical relationships, in accordance with an embodiment.
Figure 5:
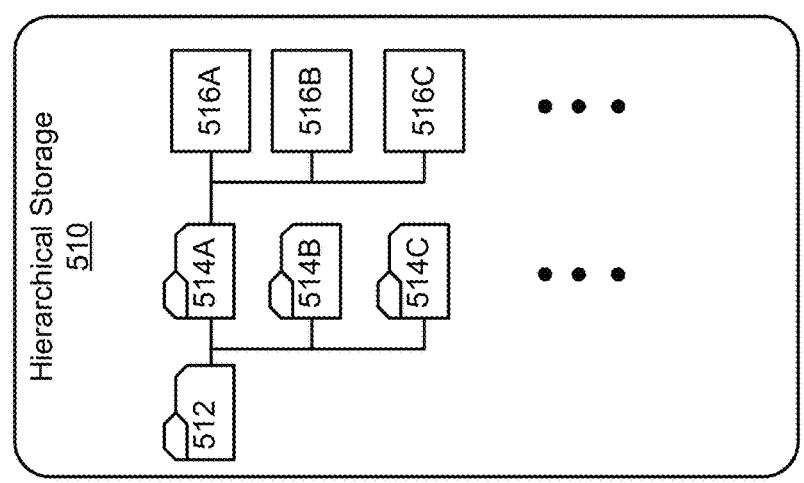

FIG. 5 illustrates examples of objects created for backing up electronic files having hierarchical relationships, in accordance with an embodiment. A server manager (e.g., 120) receives data including a plurality of files having hierarchical relationships in a hierarchical storage 510, and generates objects for a backup 500. In this example, the data includes a folder 512 associated with child folders 514A, 514B, and 514C, where the folder 514A is associated with files 516A, 516B, and 516C. The server manager 120 segregates each file into chunks, and generates objects for backing up the chunks in an object storage 520. The objects may be distributed to different storage machines (e.g., 130), according to the backup module 230 described above with reference to FIG. 2.

In one embodiment, input data may be backed up by the object storage (e.g., 520) on a request from a client device (e.g., 110). The input data includes a plurality of files (e.g., files 516A, 516B, and 516C) stored in a hierarchical structure (e.g., 510) by a computer system (e.g., computer system 600 of FIG. 6). A file (e.g., 516A) of the plurality of files is selected. An object (e.g., 550) corresponding to path information (e.g., 532) identifying a path of the file in the hierarchical structure (e.g., 510) and a file version list (e.g., 530) identifying a version of the file (e.g., 516A) is generated. The file is segregated into chunks (e.g., 542). An object (e.g., 560) corresponding to a chunk list (e.g., 534) describing an association between the file (e.g., 516A) and the chunks (e.g., 542) is generated. Objects (e.g., 560) corresponding to chunk version lists (e.g., 540) are generated. Each chunk version list (e.g., 540) identifies a version of a corresponding chunk (e.g., 542). Each object (e.g., 560) corresponding to a chunk version list (e.g., 540) has a key (e.g., Key6) indicating a latest version of the corresponding chunk (e.g., 542). The objects (e.g., 550 and 560) corresponding to the path information 532, the file version list 530, the chunk list 534, the chunk version lists 540, and the chunks (e.g., 542) are stored by the object storage (e.g., 520).

In one example, the server manager 120 generates an object for storing a disk version list 522 and an object for storing a file list 524. In addition, the server manager 120 generates objects 550 corresponding to an associated file. Examples of the objects 550 corresponding to an associated file include an object for storing a file version list 530, and an object for storing path information 532. Moreover, the server manager 120 generates objects 560 corresponding to an associated chunk of the file. Examples of the objects 560 corresponding to an associated chunk include an object for storing a chunk list 534, an object for storing a chunk version list 536, an object for storing a chunk content object 538, an object for storing a chunk version list 540, and an object for storing a chunk 542.

Assuming for an example, a first file with an identification "10" and a second file with an identification "11" are stored under a path "/home/u1/xyz" by a client device, where the first file includes content "abcd" and the second file includes content "jklm." The server manager 120 identifies a client identification associated with the client device is "24." In addition, the server manager 120 identifies that the file can be stored by a server with a server identification "47," and that the file can be stored at a disk of the server with a disk identification "2." For backing up the first file, the server manager 120 segregates the content "abcd" into a first chunk "ab" and a second chunk "cd," and generates following objects:

/customer_24/server_47/disk_2/latest_version: rp1
/customer_24/server_47/disk_2/version_list: [rp1]
/customer_24/server_47/disk_2/rp_1/inode_file: [10, 11]
/customer_24/server_47/disk_2/inode_10/meta_data/rp_1: (path-/home/u1/xyz, size:4)
/customer_24/server_47/disk_2/inode_10/version_list: [rp1]
/customer_24/server_47/disk_2/inode_10/chunk list/rp_1: [(chunk_0, rp1, cksum-ab), (chunk_1, rp_1, cksum-cd)]
/customer_24/server_47/disk_2/inode_10/chunk_0/version_list: [rp1]
/customer_24/server_47/disk_2/inode_10/chunk_0/rp_1: ab
/customer_24/server_47/disk_2/inode_10/chunk_1/version_list: [rp1]
/customer_24/server_47/disk_2/inode_10/chunk_1/rp_1: cd In the examples above, name and content are distinguished by a deliminator ":". Additional objects may be generated for the second file in a similar principle.

Further assuming that the file with the identification "10" is updated to include content "xbcdef" instead of "abcd." The server manager 120 identifies that the first chunk is updated to "xb" from "ab," the second chunk remains the same, and a third chunk "ef" needs to be added. Accordingly, the server manager 120 generates additional objects corresponding to the updated first chunk and the third chunk, and mapping information associated with them. For example, the server manager 120 may generate the following additional objects:

/customer_24/server_47/disk_2/latest_version: rp2
/customer_24/server_47/disk_2/version_list: [rp1, rp2]
/customer_24/server_47/disk_2/inode_10/version_list: [rp1, rp2]
/customer_24/server_47/disk_2/inode_10/chunk_0/version_list: [rp1, rp2]
/customer_24/server_47/disk_2/inode_10/meta_data/rp_2: (path-/home/u1/xyz, size:6)
/customer_24/server_47/disk_2/inode_10/chunk list/rp_2: [(chunk_0, rp2, cksum-xb), (chunk_1, rp_1, cksum-cd), (chunk_2, rp_1, cksum-ef)]
/customer_24/server_47/disk_2/inode_10/chunk_0/rp_2: xb
/customer_24/server_47/disk_2/inode_10/chunk_2/version_list: [rp2]
/customer_24/server_47/disk_2/inode_10/chunk_2/rp_2: ef.

Although the example above is provided for a file having a few bytes, similar principles may be applied to backup a file having a few megabytes to hundreds of gigabytes or more, where the file is segregated into thousands or millions of chunks. Accordingly, when a small portion of a file is updated from a plurality of files in a hierarchical structure, objects for the portion of the file can be newly generated and stored, while objects corresponding to duplicative portions of the file such as the second chunk of the above example may remain unchanged.

The advantages and benefits of the embodiments disclosed herein are that a plurality of files having a hierarchical structure may be backed up by an object storage more efficiently. When a portion of a file is updated, only objects corresponding to the updated portion of the file can be generated, and stored, therefore obviating the need for unnecessary storage of duplicative portions of the file. A key of each object may be used to efficiently identify a latest version of a chunk as well as derive hierarchical relationships of the files. Therefore, an updated portion of input data, e.g., having a few kilo-bytes may be quickly identified and backed up by the object storage, while the remaining portion of the input data e.g., having a few terabytes or petabytes is retained. Moreover, the operating states of a virtual machine according to a virtual disk may be backed up by an object storage by backing up only an updated portion of the virtual disk. This reduces the amount of content associated with the virtual disk being backed up. Hence, requirements for hardware resources (e.g., storage space) and time for backing up is significantly reduced.

Computing Machine Architecture

Figure 6:
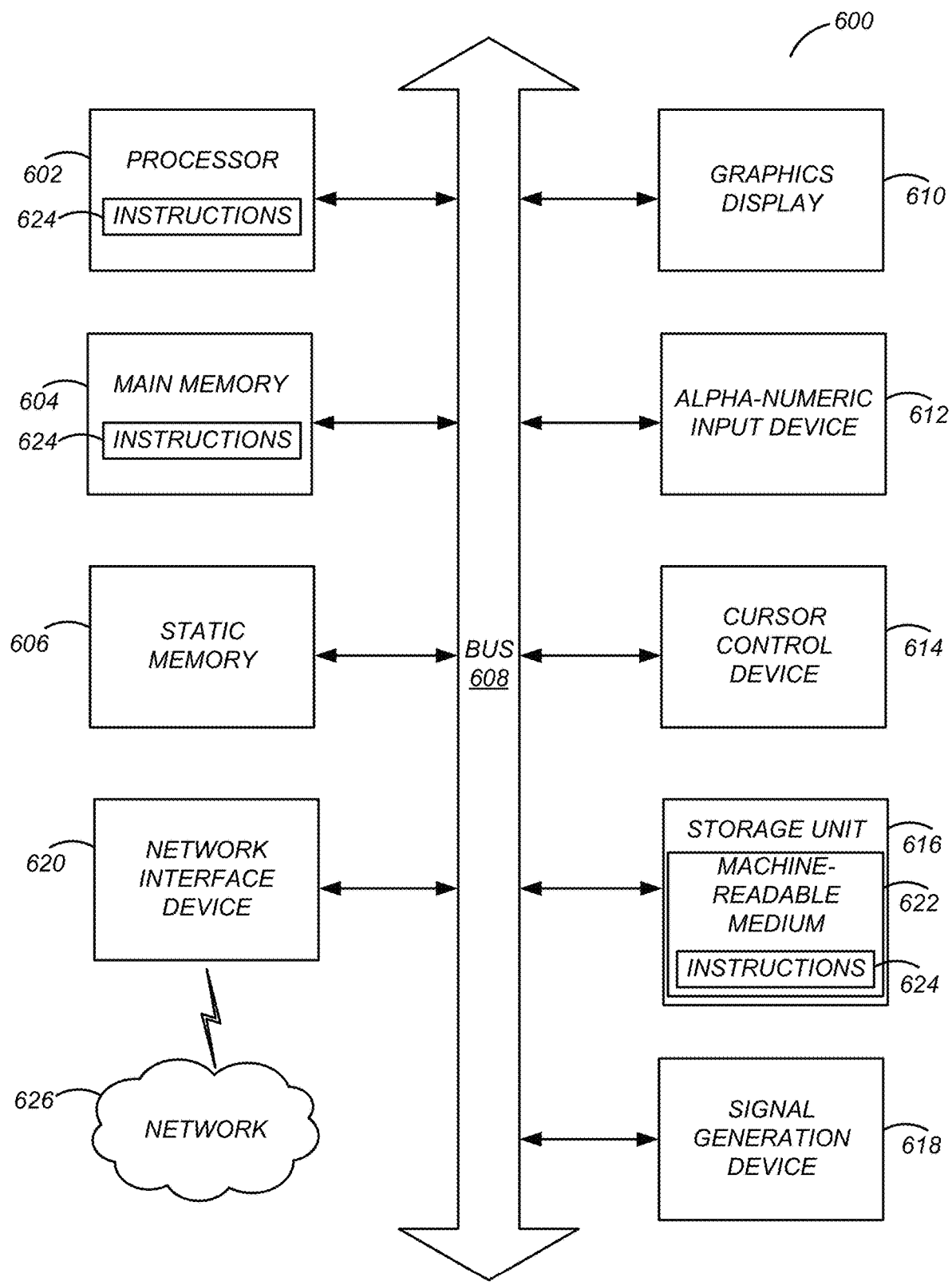
FIG. 6 illustrates components of an example machine able to read instructions from a machine-readable medium and execute them in a processor (or controller) in accordance with an embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software or program code) for causing the machine to perform any one or more of the methodologies discussed herein, e.g., with FIGS. 1-5, may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors (generally, processor 602) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 also may include alpha-numeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" may include any non-transitory storage medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Advantages of the disclosed configurations include backing up a plurality of files having a hierarchical structure through object storage by an object storage. When a portion of the file is updated, objects corresponding to the updated portion of the file can be generated, and stored by object storage, while eschewing unnecessary storage of duplicative portions of the file. In addition, a key of each object may indicate at least one of a user associated with the input data, a server of the object storage in which corresponding content is stored, and a disk of the server in which the corresponding content is stored. Accordingly, a latest version of a chunk can be easily identified, and hierarchical relationships of the files can be indirectly derived. For example, an updated portion of input data, e.g., having a few kilo-bytes may be quickly identified and backed up by the object storage, while the remaining portion of the input data e.g., having a few terabytes or petabytes may be retained. Hence, an amount of hardware resource (e.g., storage space) and time for backing up an updated portion may be significantly reduced.

In one or more embodiments, a virtual disk operating on a client device 110 may be backed up by an object storage according to the server manager 120 in a similar process for backing up a file. In one aspect, the server manager 120 generates a path information identifying a path of the virtual disk. In addition, the server manager 120 generates a virtual disk version list, where the virtual disk version list identifies a version of the virtual disk. Moreover, the server manager 120 segregates the virtual disk into chunks, and generates a chunk list describing an association between the virtual disk and the chunks. Furthermore, the server manager 120 generates chunk version lists, where each chunk version list identifies a version of a corresponding chunk. Moreover, the server manager 120 stores objects corresponding to the path information, the virtual disk version list, the chunk list, the chunk version lists, and the chunks by the object storage.

In one or more embodiments, each of the objects includes a corresponding object name and corresponding content. Each object name may identify at least one of: a user associated with the virtual disk, and a virtual machine configured by the virtual disk in which corresponding content is stored. The each object name may identify a version of corresponding content.

In one or more embodiments, the server manager 120 determines whether the virtual disk is updated or not. In response to determining that the virtual disk has been updated, the server manager 120 may determine a new chunk corresponding to the updated portion of the virtual disk, and generate a new chunk corresponding to the updated portion of the virtual disk. A new object of the new chunk may be stored by the object storage.

Advantageously, operating states of a virtual machine according to a virtual disk can be backed up by an object storage as disclosed herein. In one aspect, only an updated portion of the virtual disk is backed up to reduce an amount of content associated with the virtual disk being backed up.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of data backup through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for backing up input data by an object storage that stores data of a plurality of client devices, the input data comprising a plurality of files stored in a hierarchical structure by a computer system, the method comprising:

selecting a file of the plurality of files, the file provided by a first client device;

generating an object corresponding to path information identifying a path of the file in the hierarchical structure;

generating an object corresponding to a file version list identifying a version of the file;
segregating the file into chunks, the chunks corresponding to the file comprising a first subset of new chunks and a second subset of duplicative chunks that have been stored in the object storage, the second subset of duplicative chunks previously provided by one or more second client devices different from the first client device;
generating an object corresponding to a chunk list describing an association between the file and the chunks that comprises the first subset of new chunks and the second subset of duplicative chunks;
generating objects corresponding to chunk version lists, each chunk version list identifying a version of a corresponding chunk, each object corresponding to a chunk version list having a key indicating a latest version of the corresponding chunk, at least one key associated with a duplicative chuck that was previously provided by one of the second client devices different from the first client device; and
storing the objects corresponding to the path information, the file version list, the chunk list, the chunk version lists, and the first subset of new chunks to the object storage.

2. The computer-implemented method of claim 1, wherein each object includes a corresponding object name and corresponding content, and wherein each object name identifies one or more of:
a user associated with the input data;
a server of the object storage in which corresponding content is stored; or
a disk of the server in which the corresponding content is stored.

3. The computer-implemented method of claim 2, wherein each object name identifies a version of the corresponding content.

4. The computer-implemented method of claim 1, further comprising:
determining whether the file has been updated; and
responsive to determining that the file has been updated:
determining an updated portion of the file,
generating a new chunk corresponding to the updated portion of the file, and
storing a new object of the new chunk by the object storage.

5. The computer-implemented method of claim 4, wherein the new chunk corresponds to an updated chunk of an existing chunk from the chunks, the method further comprising:
updating the file version list to indicate a change in the version of the file;
updating the chunk list to indicate that the existing chunk has been updated;
updating a chunk version list of the existing chunk to indicate a change in the existing chunk; and
storing objects corresponding to the updated file version list, the updated chunk list, and the updated chunk version list by the object storage.

6. The computer-implemented method of claim 4, wherein the new chunk corresponds to an additional chunk not from the chunks, the method further comprising:
updating the file version list to indicate a change in the version of the file;
updating the chunk list to indicate that the new chunk has been added;
generating a new chunk version list of the new chunk; and
storing objects corresponding to the updated file version list, the updated chunk list, and the new chunk version list by the object storage.

7. A non-transitory computer-readable medium storing instructions for backing up input data by an object storage that stores data of a plurality of client devices, the input data comprising a plurality of files stored in a hierarchical structure by a computer system, the instructions executable by a processor and comprising instructions for:
selecting a file of the plurality of files, the file provided by a first client device;
generating a path information identifying a path of the file in the hierarchical structure;
generating a file version list, the file version list identifying a version of the file;
segregating the file into chunks, the chunks corresponding to the file comprising a first subset of new chunks and a second subset of duplicative chunks that have been stored in the object storage, the second subset of duplicative chunks previously provided by one or more second client devices different from the first client device;
generating a chunk list describing an association between the file and the chunks that comprises the first subset of new chunks and the second subset of duplicative chunks;
generating chunk version lists, each chunk version list identifying a version of a corresponding chunk, at least one key associated with a duplicative chuck that was previously provided by one of the second client devices different from the first client device; and
storing objects corresponding to the path information, the file version list, the chunk list, the chunk version lists, and the first subset of new chunks to the object storage.

8. The non-transitory computer-readable medium of claim 7, wherein each of the objects includes a corresponding object name and corresponding content, and wherein each object name identifies one or more of:
a user associated with the input data;
a server of the object storage in which corresponding content is stored; or
a disk of the server in which the corresponding content is stored.

9. The non-transitory computer-readable medium of claim 8, wherein the each object name identifies a version of the corresponding content.

10. The non-transitory computer readable medium of claim 7, further comprising instructions for:
determining whether the file has been updated; and
responsive to determining that the file has been updated:
determining an updated portion of the file,
generating a new chunk corresponding to the updated portion of the file, and
storing a new object of the new chunk by the object storage.

11. The non-transitory computer-readable medium of claim 10, wherein the new chunk corresponds to an updated chunk of an existing chunk from the chunks, the instructions further comprising instructions for:
updating the file version list to indicate a change in the version of the file;
updating the chunk list to indicate that the existing chunk has been updated;
updating a chunk version list of the existing chunk to indicate a change in the existing chunk; and storing objects corresponding to the updated file version list, the updated chunk list, and the updated chunk version list by the object storage.

12. The non-transitory computer-readable medium of claim 10, wherein the new chunk corresponds to an additional chunk not from the chunks, the instructions further comprising instructions for:
updating the file version list to indicate a change in the version of the file;
updating the chunk list to indicate that the new chunk has been added;
generating a new chunk version list of the new chunk; and
storing objects corresponding to the updated file version list, the updated chunk list, and the new chunk version list by the object storage.

* * * * *